United States Patent [19]

Li

[11] Patent Number: 5,745,618

[45] Date of Patent: Apr. 28, 1998

[54] OPTICAL DEVICE HAVING LOW INSERTION LOSS

[75] Inventor: Yuan P. Li, Duluth, Ga.

[73] Assignee: Lucent Technologies, Inc., Murray Hill, N.J.

[21] Appl. No.: 794,711

[22] Filed: Feb. 4, 1997

[51] Int. Cl.⁶ ..................................................... G02B 6/26
[52] U.S. Cl. .............................. 385/46; 385/37; 385/48
[58] Field of Search ................................. 385/46, 39, 43, 385/48, 50

[56] References Cited

U.S. PATENT DOCUMENTS

| | | | |
|---|---|---|---|
| 4,786,131 | 11/1988 | Mahapatra et al. | 385/46 |
| 4,902,086 | 2/1990 | Henry et al. | 350/96.12 |
| 4,904,042 | 2/1990 | Dragone | 350/96.16 |
| 5,002,350 | 3/1991 | Dragone | 350/96.15 |
| 5,058,978 | 10/1991 | Kondoh et al. | 385/48 X |
| 5,078,468 | 1/1992 | Stone | 385/46 X |
| 5,136,671 | 8/1992 | Dragone | 385/46 |
| 5,243,672 | 9/1993 | Dragone | 385/46 |
| 5,339,157 | 8/1994 | Glance et al. | 385/46 |

OTHER PUBLICATIONS

C. H. Henry, et al., "Glass Waveguides on Silicon For Hybrid Optical Packaging", Journal of Lightwave Technology, vol. 1, No. 10, pp. 1530–1539, Oct. 1989.

C. van Dam, et al., "Loss Reduction For Phased–Array Demultiplexers Using A Double Etch Technique", Integrated Photonics Research, 1996 Technical Digest Series, vol. 6, Apr. 29–May 2, 1996.

*Primary Examiner*—John D. Lee
*Assistant Examiner*—Khanh Hoang
*Attorney, Agent, or Firm*—Michael A. Morra

[57] ABSTRACT

An optical device 201, having one or more input waveguides 25 coupled to one side of a slab waveguide 20 and an array of output waveguides 26 coupled to an other side of the slab waveguide, is improved by including a transition region 22 immediately adjacent to the slab that operates to reduce insertion loss between the waveguide array 26 and the slab waveguide. The transition region includes a number of silica paths ($a_1 \ldots a_n$) that intersect the waveguide array. The silica paths have widths $W(a_n)$ that progressively decrease as they become further away from the slab waveguide. The silica paths are parallel to each other and perpendicular to the waveguide array. Disclosed embodiments include an M×N star coupler, a Dense Waveguide Division Multiplexer, and a 1×N power splitter. In each of these embodiments, insertion loss is substantially reduced over similar devices not employing such a transition region.

20 Claims, 4 Drawing Sheets

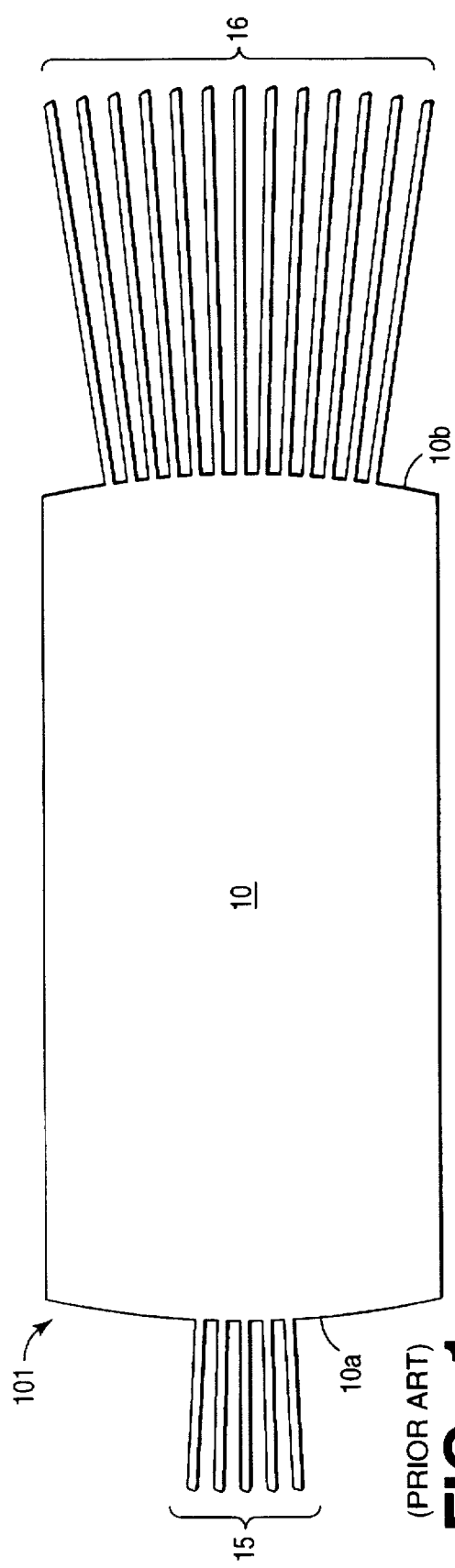
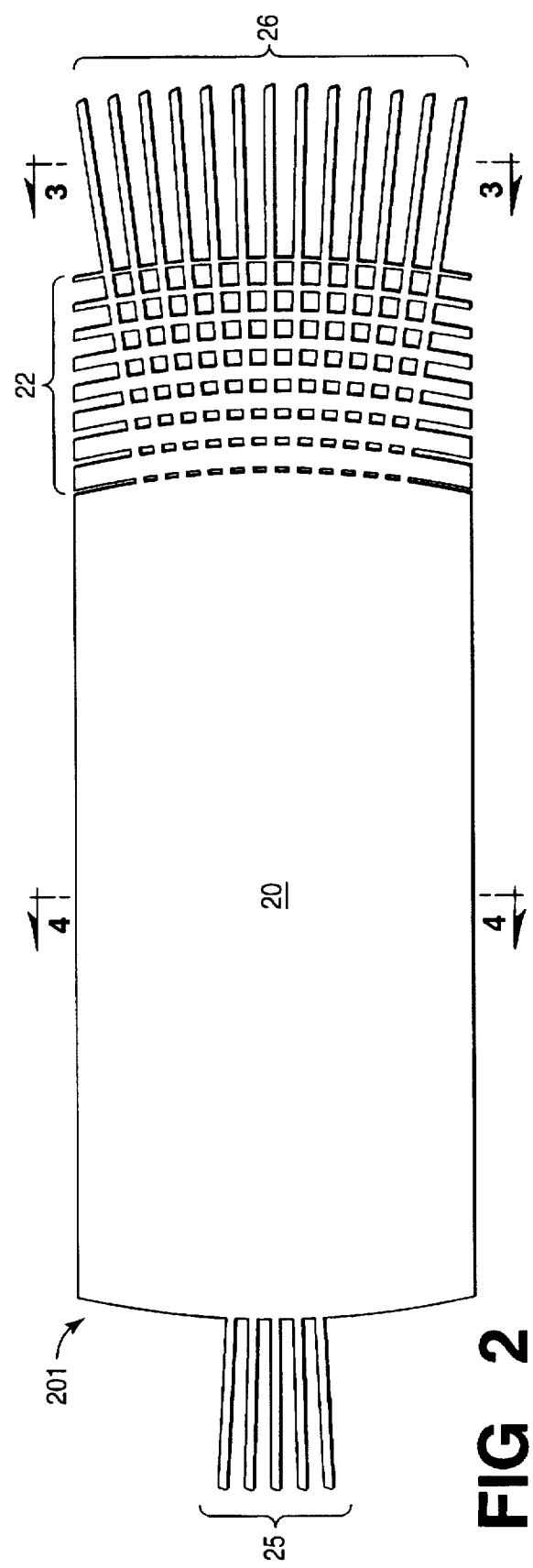

1

OPTICAL DEVICE HAVING LOW INSERTION LOSS

TECHNICAL FIELD

This invention relates to a technique for reducing the insertion loss of an optical device having an array of waveguides at its input and/or its output port, and more particularly to an optical device wherein the array of waveguides is not well coupled.

BACKGROUND OF THE INVENTION

Optical fiber networks are increasingly important for the distribution of voice, video, and data signals. Such systems generally involve a number of feeder fibers that emanate from a headend office, and terminate at respective remote terminals. In a Fiber-To-The-Home or a Fiber-To-The-Curb system, optical signals are transmitted from each of these remote terminals to a number of optical network units over distribution fiber. A variety of network architectures have been proposed for transmitting signals between the remote terminals and the optical network units. One popular architecture uses a passive optical branching device to exchange signals between the feeder and distribution fibers, and this is particularly desirable because power is not required. However, because each branching device introduces signal loss, and because branching devices are cascaded in large optical networks, the ability to distribute optical signals to a large number of customers is limited by the signal loss associated with the branching device.

One important branching device is an optical "star coupler" in which waveguides are radially positioned on opposite sides of a slab waveguide. As used in the present invention, a slab waveguide (hereinafter "slab") means a planar area, which is large compared to the area of an individual waveguide of the same length, that supports lightwave transmission between input and output waveguides. Optical power entering the slab from input waveguides on one side of the slab is conveyed to output waveguides on the other side. (Ideally, the power is distributed equally among all of the output waveguides.) In an M×N star coupler, for example, the optical power carried by each input waveguide is transmitted across the slab and distributed among the N output waveguides, which are generally arranged in an array. However, if the waveguides in the output array are not well coupled (which is generally the case for star couplers in a "Dragone" router because of the gaps between the array waveguides), then there is a loss of power due to the scattering of light at the junction between the array and the slab. Such losses comprise a major portion of the router's insertion loss.

One technique for reducing the insertion loss of an optical device, such as the Dragone router, is taught in a paper entitled: *Loss reduction for phased-array demultiplexers using a double etch technique*, which was published in *Integrated Photonics Research*, Technical Digest Series, Vol. 6, Apr. 29–May 2, 1996. In this technique, a transition region having a shallow etch depth is inserted at the junction between the slab and the array waveguides. As might be expected, coupling between adjacent waveguides is improved and coupling losses are decreased. Nevertheless, a greater reduction in insertion loss is desired, and the double etch technique adds a processing step.

What is desired, and what does not appear to be disclosed in the prior art, is an improved technique for reducing insertion loss in an optical device over what is available in the prior art. Preferably, such a technique does not involve additional processing steps.

SUMMARY OF THE INVENTION

An optical device, having one or more input waveguides coupled to one side of a slab waveguide and an array of output waveguides coupled to an other side of the slab waveguide, is improved by including a transition region immediately adjacent to the slab that operates to reduce insertion loss between the waveguide array and the slab waveguide. The transition region includes a number of silica paths that intersect the waveguide array. The silica paths have widths that progressively decrease as they become further away from the slab waveguide.

In the illustrative embodiments of the invention, the silica paths are parallel to each other and perpendicular to the waveguide array that they intersect. The silica paths have an index of refraction which is the same as the index of refraction of the slab waveguide and the waveguide array. In one of the disclosed embodiments, the optical device is an M×N star coupler comprising a slab waveguide that is optically coupled to M input waveguides and N output waveguides.

In another illustrative embodiment of the invention, the optical device is a Dense Waveguide Division Multiplexer (DWDM) comprising a pair of M×N star couplers that are interconnected by a plurality of unequal-length waveguides.

In yet another illustrative embodiment of the invention, the optical device is a 1×N power splitter.

In each of these embodiments, the insertion loss is substantially reduced by the use of the above-described transition region. Illustratively, insertion loss in a typical star coupler is reduced from about 0.8 dB to about 0.3 dB.

BRIEF DESCRIPTION OF THE DRAWINGS

The invention and its mode of operation will be more clearly understood from the following detailed description when read with the appended drawing in which:

FIG. 1 shows a prior art "star coupler" having a number of input and output ports;

FIG. 2 discloses a star coupler having a transition region comprising multiple paths of silica material at its output ports that reduce insertion loss;

DETAILED DESCRIPTION

Figure 3:
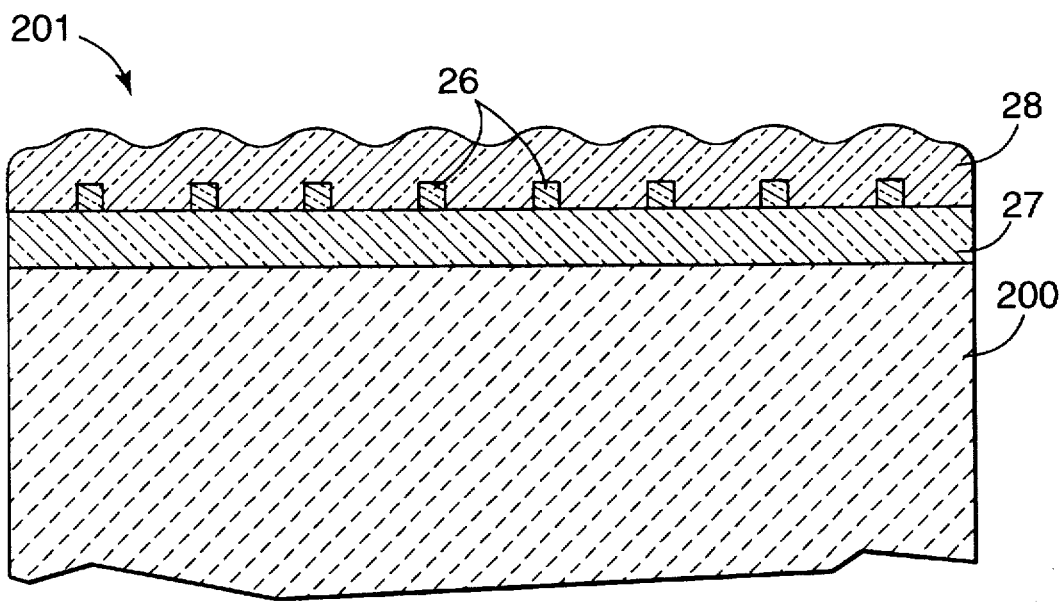
FIG. 3 discloses a cross-section view of the star coupler shown in FIG. 2 showing its output waveguides.

FIG. 1 discloses a known star coupler, which splits the optical power entering any of its input ports among all of its output ports. Star coupler 101 includes a free-space region 10, which comprises an optical slab waveguide 10 having two curved, preferably circular, boundaries 10a and 10b. Power transfer, between an input waveguide array 15 and an output waveguide array 16, is accomplished through radiation in the slab 10. These waveguide arrays 15, 16 are radially directed toward virtual focal points and configured so that their respective foci are located a predetermined distance away from and outside the slab 10 to minimize phase errors caused by mutual coupling between adjacent waveguides. Each of these waveguide arrays is coupled to the slab 10 in a substantially uniform fashion along boundaries 10a and 10b. Such star couplers are constructed using silicon optical bench (SiOB) technology, discussed below, on a single glass substrate. Star couplers are well understood by those skilled in the art of planar optical devices and are described in a number of patents including U. S. Pat. No. 4,904,042. As discussed above, there is a loss of power due to the scattering of light at the junction between the array and the slab. Such loss is referred to as insertion loss and, in the case of star coupler 101, it amounts to about 0.8 dB at an operating wavelength ($\lambda$) of 1.55 microns (where: 1 micron=1µm=one millionth of a meter), which is too much.

FIG. 2 discloses a star coupler 201 having a transition region 22 comprising a plurality of paths of silicon material, which are generally parallel to each other and which transversely intersect the output waveguides 26 that significantly reduce insertion loss. The use of such a transition region 22 reduces the insertion loss from about 0.8 dB to about 0.3 dB. Stated differently, in the prior art star coupler shown in FIG. 1, when the total optical input power is 1 milliwatt (mW), the total output power is 0.832 mW; but in the star coupler shown in FIG. 2, when the total input power is 1 mW, the total output power is 0.933 mW. This improvement translates into the ability to either serve more customers with the same equipment, or to reduce the amount of equipment needed to serve the same number of customers.

It is noted that the Figures herein are not drawn to scale in order to clarify the invention. For example, transition region 22 is shown having only eight silica paths that intersect waveguide array 26. However, in a preferred embodiment, there are between 20 and 40 such paths, and preferably 30. Moreover, transition region 22 is shown extending for a substantial distance away from the slab waveguide 20. In a star coupler, slab lengths typically range from about 0.5 centimeters (cm) to about 2.0 cm—depending on the number of input and output waveguides, whereas transition region 22 only extends about 0.06 cm away from the slab. Before describing the geometry of the transition region, some background material regarding the construction of optical integrated circuits is presented.

Silicon Optical Bench (SiOB) Technology

The most advanced and technically developed planar waveguides are doped-silica waveguides fabricated with SiOB technology. A doped-silica waveguide is usually preferred because it has a number of attractive properties including low cost, low loss, low birefringence, stability, and compatibility for coupling to fiber. Further, the processing steps are compatible with those in silicon integrated circuit (IC) technology, which are geared for mass production and are readily known.

Generally, a doped-silica waveguide is formed by initially depositing a base or lower cladding layer of low index silica on a carrier substrate, which typically comprises silicon or silica. A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is generally described in U.S. Pat. No. 4,902,086 issued to C. H. Henry et al., and in an article entitled "*Glass Waveguides on Silicon for Hybrid Optical Packaging*" at pp. 1530–1539 of the *Journal of Lightwave Technology*, Vol. 7, No. 10, October 1989—both of which are hereby incorporated by reference.

Critical to the performance of any planar optical waveguide are the waveguide dimensions, i.e., the height and width of the waveguide core, and the refractional difference of the refractive index between the core and the cladding of the waveguide, denoted as $\Delta$. The height or thickness of the core is determined by the amount of core material deposited on a carrier substrate;; and the width of the core is determined by the photo-lithographic mask and undercut in chemical etching. The $\Delta$ of the waveguide is mostly determined by the material system and the fabrication process. In practice, different waveguide structures and systems are used for different types of functions and tradeoffs are made in the core dimensions and $\Delta$ to optimize different aspects of optical performance.

Illustratively, P-doped waveguides are used in the present invention, each having a core whose thickness is about 7 µm, and each resting on a 15 µm lower cladding layer. A 15 µm upper cladding layer covers the waveguide cores. The dimensions of the waveguide cores are chosen to be as large as possible for strong optical confinement and low propagation loss, but small enough so that the waveguides remain singlemode. Similarly, the silica paths that comprise the transition region have cores that are about 7 µm high; but their widths vary from about 18 µm (near the slab) to about 2 µm (distant from the slab).

Referring now to FIG. 3, a cross section of star coupler 201 is shown in order to illustrate its dimensions and materials in the region where waveguides 26 are present. Substrate 200 comprises silicon having a thickness of 500 µm. Cladding 27 comprises a 15 µm layer of silica having an index of refraction of about 1.445 at a wavelength ($\lambda$) of 1.55 µm. Waveguide cores 26 are generally square, they have a thickness and width of about 7 µm, and they comprise silica having an index of refraction of about 1.454 at $\lambda$=1.55 µm. The waveguide cores 26 are separated by a distance of about 2.5 µm where they are closest together at their junction with slab 20 (see FIG. 2). The fact that the core material has a higher index of refraction than the cladding material enables the core to guide lightwaves in accordance with Snell's law. Cladding layer 28, which is substantially the same as cladding layer 27 in refractive index, is deposited on top of cores 26 to complete the structure.

Figure 4:
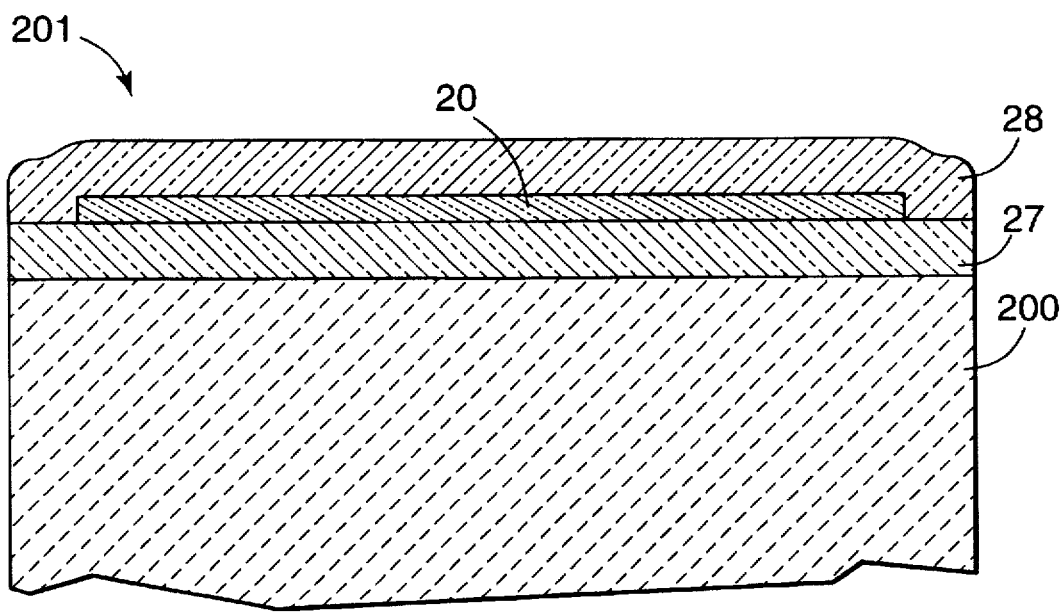
FIG. 4 discloses a cross-section view of the star coupler shown in FIG. 2 in the vicinity of its slab.

In FIG. 4, another cross section of the star coupler 201 is disclosed in order to illustrate its dimensions and materials in the region of the slab waveguide 20.

Substrate 200 and cladding layers 27, 28 are described above. Slab waveguide 20 and the silica paths that make up the transition region 22 (see FIG. 2) comprise the same material as the waveguide cores 26. Indeed, the slab and the waveguide cores are fabricated in the same step as the silica paths of the transition region, and so they all have the same thickness. A more detailed discussion of the slab, the waveguide cores and the silica paths in the transition region follows.

Figure 5:
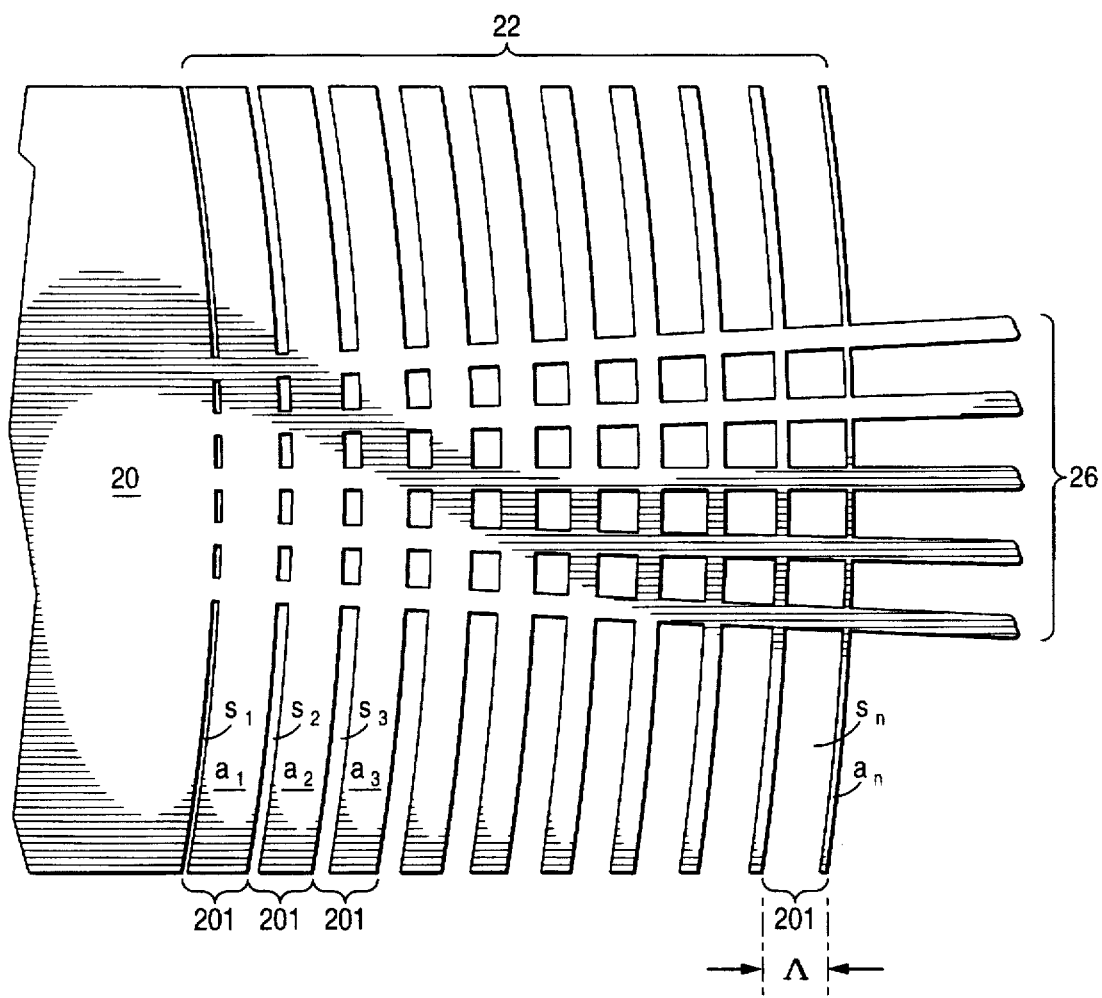
FIG. 5 is a magnified view of the output transition region of the star coupler shown in FIG. 2, showing the decreasing widths of the paths.

FIG. 5 provides a magnified view of the transition region 22 of star coupler 201 (see FIG. 2). FIG. 5 illustrates that the silica paths $a_1 \ldots a_n$, which comprise the transition region, have progressively smaller widths as they become further away from the slab 20. (It is understood that the term "silica paths" refers to paths of core material whose index of refraction is substantially the same as slab 20 and waveguide cores 26). It has been found that the optimum number of silica paths for this particular star coupler is about thirty (30); although meaningful improvement has been measured with as few as ten (10) silica paths. In the embodiment shown in FIG. 5, silica path a, has a width of about 18 µm whereas silica path $a_n$ has a width of about 2 µm. Moreover, separation gaps $s_1 \ldots s_n$, between adjacent silica paths become progressively larger as they become further away from the slab 20. The width W of the first separation gap $s_1$ is about 2 µm whereas the width of separation gap $s_n$ is about 18 µm. In this illustrative embodiment, the combined width 201 of each path $a_n$ and its adjacent separation gap $s_n$ is a constant that can be mathematically expressed as follows:

$$W(a_n)+W(s_n)=\Lambda, \text{ for } 1 \leq n \leq 30$$

Figure 6:
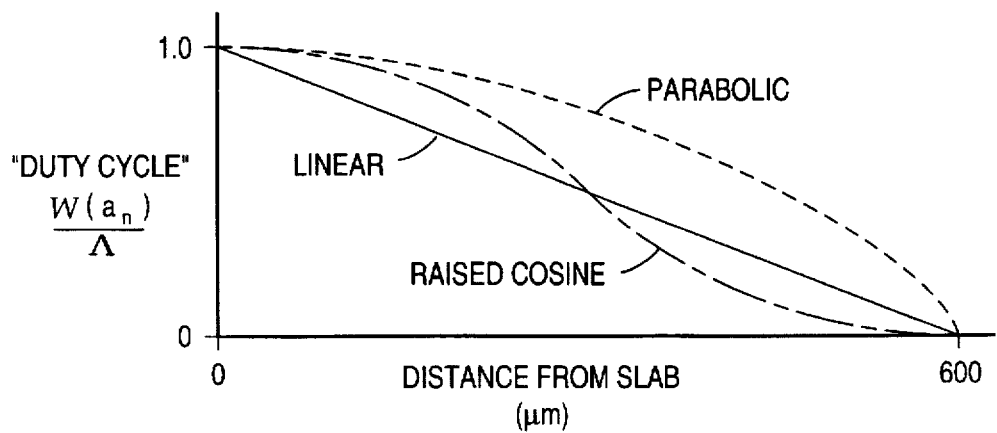
FIG. 6 illustrates various techniques for progressively decreasing the widths of the paths.

In the preferred embodiment, the period ($\Lambda$)=20 µm. FIG. 5 is not a dimensionally exact view of the star coupler; rather, the relative sizes of the silica paths $a_1 \ldots a_n$, the waveguide cores 26, and the slab 20 have been drawn to illustrate that the widths of the silica paths decrease as they become progressively further away from the slab 20; and that the silica paths, the waveguides, and the slab are coplanar and comprise the same material. In FIG. 5 the widths of silica paths $a_1 \ldots a_n$, are shown decreasing linearly. However, a number of variations are possible that improve insertion loss over the prior art. For example, $\Lambda$ does not need to be a constant and the silica path widths do not need to decrease linearly. If, for example, it has been decided that $\Lambda$ is to be constant, then the ratio of the path width $W(a_n)$ to the period $\Lambda$ can be viewed as a "duty cycle." Moreover, the duty cycle $W(a_n)/\Lambda$ can be related to the distance from the slab by a number of functional relationships including, but not limited to, raised cosine, linear, and parabolic. These functional relationships are graphically illustrated in FIG. 6. However, the important requirement to be followed in achieving the benefits of the present invention is that $W(a_n)$ decreases as the silica paths $a_1 \ldots a_n$ become progressively further away from the slab.

Figure 7:
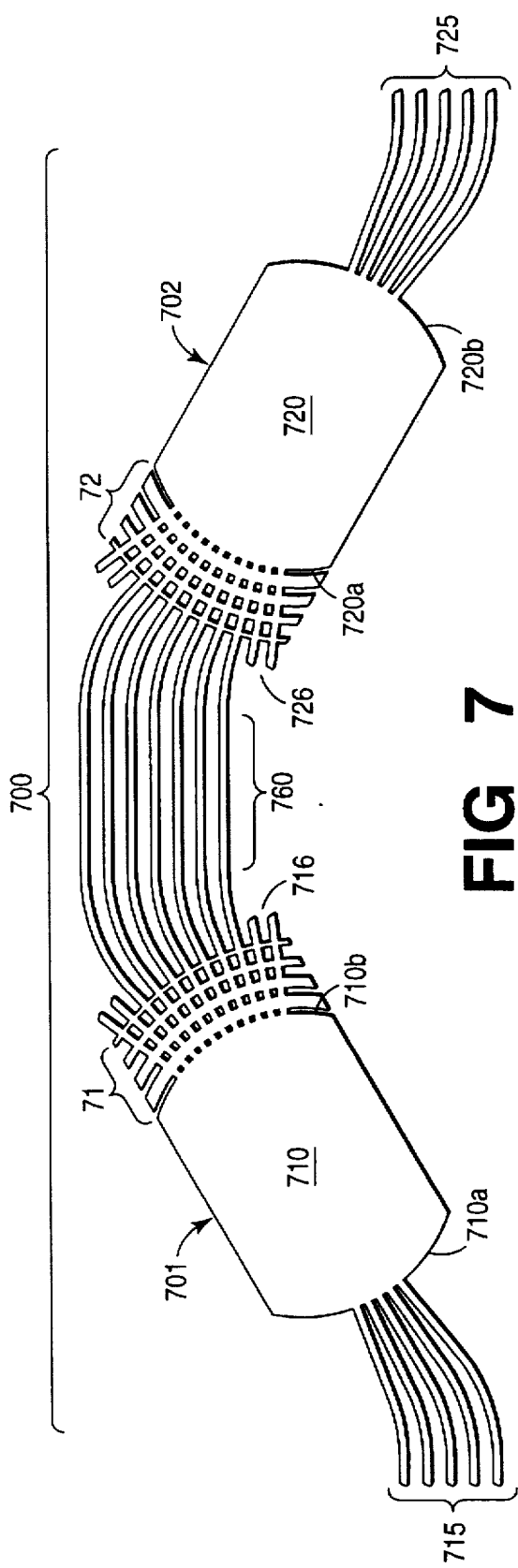
FIG. 7 discloses a Dense Wave-Division Multiplexer utilizing star couplers having low coupling loss, which is achieved through use of the present invention.

FIG. 7 discloses a Dense Wave-Division Multiplexer (DWDM) 700 comprising a pair of star couplers 701, 702 that are interconnected by a number of unequal-length waveguides 760. Each star coupler comprises a slab waveguide between its input and output waveguide arrays. Each array is radially directed toward a virtual focal point, and configured so that the foci are located at a predetermined distance away from and outside the slab to minimize phase errors caused by mutual coupling between adjacent waveguides. In star coupler 701, power transfer between array 715 and array 716 is accomplished via radiation in the slab 710. Each of these waveguide arrays is connected to the slab 710 in a substantially uniform fashion along boundaries 710a and 710b respectively. Similarly, in star coupler 702, power transfer between array 725 and array 726 is accomplished via radiation in the slab 720. Each of these waveguide arrays is connected to the slab 720 in a substantially uniform fashion along boundaries 720a and 720b respectively.

The length of each waveguide in the grating 760 differs from the lengths of all the other waveguides in the grating so that predetermined and different phase shifts are applied to optical signals propagating through the waveguides of the grating from the star coupler 701 because of the different path lengths over which the signals in the grating must travel to reach the output of the grating Accordingly, the optical signals emanating from each of the waveguides of grating 760 have different phases, which are functions of the lengths of the waveguides.

In DWDM 700, demultiplexing is accomplished by transmitting a multiplexed signal through diffraction grating 760, which separates the individual wavelengths of light and diffracts each in a slightly different direction. Multiplexing is accomplished by utilizing DWDM 700 in reverse (i.e., shining each wavelength through the grating at a predetermined wavelength-dependent angle such that all of the wavelengths emerge essentially as one single multiplexed beam of light). The grating function is achieved using an optical, phased array that is constructed from a plurality of waveguides of different lengths. Each waveguide differs in length from its neighboring waveguide by a predetermined amount. The waveguides are substantially uncoupled throughout their entire lengths, except at their ends, where strong mutual coupling between the waveguides is desirable to reduce insertion loss, as explained above. The transition from the coupled portions to the uncoupled portions is gradual, resulting in negligible higher-order mode generation. A discussion of the operation of waveguide grating arrays is presented in U. S. Pat. No. 5,002,350. Moreover, U. S. Pat. No. 5,136,671 is hereby incorporated by reference because it discloses the general design of such DWDMs in greater detail. This type of DWDM structure is also known as a "Dragone" router after its inventor. Significantly, insertion loss is reduced in DWDM 700 by adding transition regions 71, 72 whose design is the same as transition region 22 shown in FIG. 5.

Power Splitters

Figure 8:
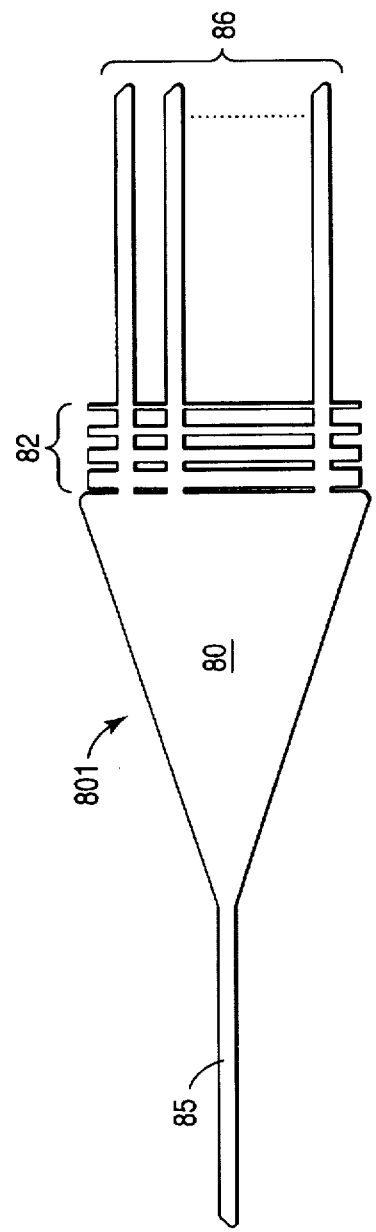
FIG. 8 discloses a branch power splitter having low coupling loss, which is achieved through use of the present invention.

A 1×N power splitter consists of a single input waveguide that subdivides into a number (N) of output waveguides. Because this structure frequently resembles the branches of a tree, power splitters are often referred to as branch splitters. As shown in FIG. 8, power splitter 801 comprises an input waveguide 85 and output waveguides 86 that are all coupled to a waveguide region 80 which is designed to efficiently transfer all of the input power to the output waveguides 86. The design of such a low loss optical power splitter is disclosed in application Ser. No. 08/660,245 which was filed on Jun. 7, 1996. As discussed above, a slab waveguide means a planar area, which is large compared to the area of an individual waveguide of the same length, that supports lightwave transmission between input and output waveguides. Accordingly, waveguide region 80 is hereinafter referred to as a slab waveguide.

The insertion loss associated with power splitter 801 is decreased by the use of a transition region 82, which is immediately adjacent to the slab waveguide 80 and which comprises a number of silica paths that transversely intersect the output waveguides 86. Slab waveguide 80 has a length of about 500 µm, and over this length its width gradually increases from about 7 µm to about 100 µm. The silica paths comprising transition region 82 are generally parallel to each other and have widths that progressively decrease as they become further away from the slab waveguide. And while only a few silica paths are shown in FIG. 8, it is preferable to use a larger number (e.g., 30) of such paths. The construction of transition region 82 is substantially the same as the construction of transition region 22 which was discussed in connection with FIGS. 2–6.

Although various particular embodiments of the present invention have been shown and described, modifications are possible within the spirit and scope of the invention. These modifications include, but are not limited to, use of the novel transition region on multiple sides of a slab waveguide, decreasing the widths of the silica paths that comprise the transition region in a non-linear manner, and using the novel transition region on less than all of the waveguides in an array.

I claim:

1. An optical device having at least one input waveguide coupled to one side of a slab waveguide and an array of output waveguides coupled to an other side of the slab waveguide,

CHARACTERIZED BY a transition region, which is immediately adjacent to the slab waveguide and which comprises a plurality (n) of silica paths that intersect the output waveguide array, the silica paths having widths that progressively decrease as they become further away from the slab waveguide.

2. The optical device of claim 1 wherein the slab waveguide and the output waveguide array each comprise a light-carrying (core) material whose index of refraction is equal to the index of refraction of the silica paths.

3. The optical device of claim 2 wherein the separation between each pair of silica paths has a lower index of refraction than the silica paths, the widths of the separation gaps increasing as they become further away from the slab waveguide.

4. The optical device of claim 2 wherein the silica paths are parallel to each other.

5. The optical device of claim 2 wherein the silica paths are perpendicular to the output waveguide array.

6. The optical device of claim 1 wherein the width of each silica path decreases linearly as it becomes further away from the slab waveguide.

7. The optical device of claim 1 wherein: n>10.

8. The optical device of claim 1 wherein the optical device comprises a star coupler having a plurality of input waveguides and a plurality of output waveguides.

9. The optical device of claim 1 wherein the optical device comprises a branch power splitter having a single input waveguide and a plurality of output waveguides.

10. An optical device comprising a slab waveguide coupled to a waveguide array along a side thereof, the device further comprising a plurality (n) of silica paths, which are immediately adjacent to the side of the slab and which intersect the waveguide array, each of the silica paths $(a_n)$ having a width $W(a_n)$ that decreases as it becomes further away from the slab waveguide.

11. The optical device of claim 10 wherein $W(a_n)$ decreases linearly as it becomes further away from the slab waveguide.

12. The optical device of claim 10 wherein a separation gap $(s_n)$, having a width $W(s_n)$, is positioned between each pair of silica paths, the combined width of each silica path and its adjacent separation gap having the following relationship:

$$W(a_n)+W(s_n)=\Lambda,$$

where $\Lambda$ is a constant.

13. The optical device of claim 12 wherein $\Lambda$ is about 20 μm.

14. The optical device of claim 12 wherein: n>10.

15. The optical device of claim 14 wherein: 20 <n<40.

16. An optical device comprising a first star coupler having a first waveguide array that is coupled to a first slab waveguide;

a second star coupler having a second waveguide array that is coupled to a second slab waveguide, which includes a transition region comprising a number of silica paths immediately adjacent thereto that intersect the second waveguide array, the silica paths having widths that progressively decrease as they become further away from the second slab waveguide; and a grating comprising a plurality of unequal-length waveguides that interconnect the first and second waveguide arrays.

17. The optical device of claim 16 wherein the first slab waveguide includes a transition region comprising a plurality of silica paths that intersect the first waveguide array, the silica paths having widths that progressively decrease as they become further away from the first slab waveguide.

18. The optical device of claim 16 wherein the width of each silica path decreases linearly as it becomes further away from the second slab waveguide.

19. The optical device of claim 16 wherein the number of silica paths is greater than ten.

20. The optical device of claim 16 wherein the silica paths are substantially parallel to each other and substantially perpendicular to the second waveguide array.

* * * * *